(12) United States Patent
Huelsman et al.

(10) Patent No.: US 8,055,604 B2
(45) Date of Patent: *Nov. 8, 2011

(54) RULE PROCESSING METHOD, APPARATUS AND COMPUTER-READABLE MEDIUM TO PROVIDE IMPROVED SELECTION ADVICE

(75) Inventors: David L. Huelsman, Reynoldsburg, OH (US); Sharon E. Love, Blacklick, OH (US); Douglas M. Mair, Westerville, OH (US)

(73) Assignee: Verde Sabor Assets, L.L.C., Wilmington, DE (US)

( * ) Notice: Subject to any disclaimer, the term of this patent is extended or adjusted under 35 U.S.C. 154(b) by 192 days.

This patent is subject to a terminal disclaimer.

(21) Appl. No.: 12/467,928

(22) Filed: May 18, 2009

(65) Prior Publication Data
US 2009/0228420 A1 Sep. 10, 2009

Related U.S. Application Data

(62) Division of application No. 10/950,815, filed on Sep. 28, 2004, now Pat. No. 7,552,102.

(60) Provisional application No. 60/506,156, filed on Sep. 29, 2003.

(51) Int. Cl.
*G06N 5/02* (2006.01)
(52) U.S. Cl. .................................................. 706/47
(58) Field of Classification Search .................. 706/47
See application file for complete search history.

(56) References Cited

U.S. PATENT DOCUMENTS

| 5,212,771 | A | 5/1993 | Gane et al. |
|---|---|---|---|
| 5,301,284 | A | 4/1994 | Estes et al. |
| 5,311,424 | A | 5/1994 | Mukherjee et al. |
| 5,367,619 | A | 11/1994 | Dipaolo |
| 5,576,965 | A | 11/1996 | Akasaka et al. |
| 5,630,025 | A | 5/1997 | Dolby et al. |
| 5,701,400 | A | 12/1997 | Amado |
| 5,745,765 | A | 4/1998 | Paseman |

(Continued)

FOREIGN PATENT DOCUMENTS
WO 9948031 9/1999
(Continued)

OTHER PUBLICATIONS

Alan Mishchenko ("An introduction to Zero-Suppressed Binary Decision Diagrams" Jun. 2001) (in parent U.S. Appl. No. 10/950,815, now U.S. Patent No. 7,552,102).*

(Continued)

*Primary Examiner* — Jeffrey A Gaffin
*Assistant Examiner* — Lut Wong
(74) *Attorney, Agent, or Firm* — Stolowitz Ford Cowger LLP

(57) ABSTRACT

A computer-implemented method, apparatus or computer-readable medium to provide selection advice during rule processing to help a user choose desired specifications of a product, service, or other rule-based system characterized by a ZDD rule model having one or more Include and/or Exclude rules. One aspect includes displaying on a monitor or other I/O device multiple attributes having multiple enumerations that identify possible feature, specifications, or conditions of a product; selecting multiple alternative enumerations of the attributes; determining a selection advice for each enumerations selected combining the selection advice for each numerations in order to produce result; communicating the result to an end user; and then using the result to choose a product having desired compliant specifications or conditions.

21 Claims, 15 Drawing Sheets

U.S. PATENT DOCUMENTS

| | | | |
|---|---|---|---|
| 5,805,462 | A | 9/1998 | Poirot et al. |
| 5,809,212 | A | 9/1998 | Shasha |
| 5,844,554 | A | 12/1998 | Geller et al. |
| 5,877,966 | A | 3/1999 | Morris et al. |
| 5,889,993 | A | 3/1999 | Kroeger |
| 5,910,898 | A | 6/1999 | Johannsen |
| 5,924,077 | A | 7/1999 | Beach et al. |
| 5,963,953 | A | 10/1999 | Cram et al. |
| 5,987,473 | A | 11/1999 | Jorgensen |
| 6,002,854 | A | 12/1999 | Lynch et al. |
| 6,016,394 | A | 1/2000 | Walker |
| 6,031,984 | A | 2/2000 | Walser |
| 6,035,305 | A | 3/2000 | Strevey et al. |
| 6,064,982 | A | 5/2000 | Puri |
| 6,076,080 | A | 6/2000 | Morscheck et al. |
| 6,163,876 | A | 12/2000 | Ashar |
| 6,182,275 | B1 | 1/2001 | Beelitz et al. |
| 6,226,656 | B1 | 5/2001 | Zawadzki et al. |
| 6,256,618 | B1 | 7/2001 | Spooner et al. |
| 6,321,186 | B1 | 11/2001 | Yuan et al. |
| 6,327,581 | B1 | 12/2001 | Platt |
| 6,349,290 | B1 | 2/2002 | Horowitz |
| 6,385,617 | B1 | 5/2002 | Malik |
| 6,389,576 | B1 | 5/2002 | Lam et al. |
| 6,396,488 | B1 | 5/2002 | Simmons et al. |
| 6,424,962 | B1 | 7/2002 | Billon |
| 6,442,732 | B1 | 8/2002 | Abramovici et al. |
| 6,519,767 | B1 | 2/2003 | Carter et al. |
| 6,529,890 | B1 | 3/2003 | Pandit et al. |
| 6,535,883 | B1 | 3/2003 | Lee et al. |
| 6,556,978 | B1 | 4/2003 | Ginsberg et al. |
| 6,567,814 | B1 | 5/2003 | Bankier |
| 6,598,035 | B2 | 7/2003 | Branson et al. |
| 6,651,096 | B1 | 11/2003 | Gai et al. |
| 6,658,458 | B1 | 12/2003 | Gai et al. |
| 6,741,975 | B1 | 5/2004 | Nakisa et al. |
| 6,795,832 | B2 | 9/2004 | McGeorge et al. |
| 6,874,016 | B1 | 3/2005 | Gai et al. |
| 6,952,812 | B2 | 10/2005 | Abadir et al. |
| 6,961,913 | B1 | 11/2005 | Okazaki et al. |
| 6,983,187 | B2 | 1/2006 | Kern |
| 7,062,478 | B1 | 6/2006 | Huelsman et al. |
| 7,130,783 | B1 | 10/2006 | Harer et al. |
| 7,188,333 | B1 | 3/2007 | LaMotta et al. |
| 7,587,379 | B2 | 9/2009 | Huelsman et al. |
| 7,734,559 | B2 | 6/2010 | Huelsman |
| 2001/0029499 | A1 | 10/2001 | Tuatini et al. |
| 2002/0065701 | A1 | 5/2002 | Kim et al. |
| 2002/0078431 | A1 | 6/2002 | Reps |
| 2002/0095645 | A1 | 7/2002 | Rodeh |
| 2002/0108093 | A1 | 8/2002 | Moondanos et al. |
| 2002/0112213 | A1 | 8/2002 | Abadir et al. |
| 2002/0165701 | A1* | 11/2002 | Lichtenberg et al. ............ 703/7 |
| 2002/0178432 | A1 | 11/2002 | Kim et al. |
| 2003/0220926 | A1 | 11/2003 | Huelsman et al. |
| 2004/0138988 | A1 | 7/2004 | Munro et al. |
| 2004/0181500 | A1 | 9/2004 | Huelsman et al. |
| 2004/0260667 | A1 | 12/2004 | Huelsman et al. |
| 2005/0080648 | A1 | 4/2005 | Huelsman et al. |
| 2005/0108183 | A1 | 5/2005 | Huelsman et al. |
| 2007/0112767 | A1 | 5/2007 | Tilley |
| 2007/0159304 | A1 | 7/2007 | Agarwal et al. |
| 2007/0290791 | A1 | 12/2007 | Batra |
| 2009/0313201 | A1 | 12/2009 | Huelsman et al. |
| 2010/0318476 | A1 | 12/2010 | Huelsman et al. |

FOREIGN PATENT DOCUMENTS

| | | |
|---|---|---|
| WO | 0111463 | 2/2001 |
| WO | WO03081478 | 10/2003 |

OTHER PUBLICATIONS

Stolowitz Ford Cowger LLP; Related Case Listing.; Jan. 6, 2011; 1 page.

Minato, Zero-Suppressed BDDs for Set Manipulation in Combinatorial Problems, Proceedings of the 30th Conference on Design Automation, Jul. 1993, pp. 272-277.

Cabodi, et al., Symbolic Traversals of Data Paths with Auxilary Variables, IEEE, 1994, pp. 93-96.

Panda, et al., Symmetry Detection and Dynamic Variable Ordering of Decision Diagrams, Proceedings of the 1994 IEEE/ACM International Conference on Computer-Aided Design, Nov. 1994, pp. 628-631.

Cosnard, et al., Automatic Task Graph Generation Techniques, Proceedings of the Twenty-Eighth Hawaii International Conference on System Sciences, Vo. 2, Jan. 3, 1995, pp. 113-122.

Bryant, Binary Decision Diagrams and Beyond, Enabling Technologies for Formal Verification, IEEE, 1995, pp. 236-243.

Minato, S., Representations of Discrete Funtions, Chapter 1, Graph-Based Representations of Discrete Functions, Sasao and Fujia, ed.s, 1996, Kluwer Academic Publishing, pp. 1-23.

Anderson, An Introduction to Binary Decision Diagrams, University of Denmark, Oct. 1997, pp. 8-11.

Cugola, G, et al., Exploiting an event-based infrastructure to develop complex distributed systems, Proceedings of the 20th International Conference on Software Engineering, Apr. 1998.

Gottlob, et al., The complexity of acyclic conjunctive queries, 39th Annual Symposium on Foundations of Computer Science Proceedings, Nov. 8, 1998, pp. 706-715.

Yang, Optimizing Model Checking Based on BDD Characterization,Thesis, Carnegie Mellon U.,May 1999, pp. 9-11.

Ejnioui, et al., Design Partitioning on Single-chip Emulations Systems, Thirteenth International Conference on VLSI Design, Jan. 3, 2000, pp. 234-239.

Kurihara, et al., BDD Encoding for Partial Order Constraints and its Application to Expert Systems in Software Verification Domains, 2000 IEEE International Conference on Systems, Man, Cybernetics, vol. 3, Oct. 8-11, 2000, pp. 2062-2067.

Beck, M., et al., Enabling Full Service Surrogates Using the Portable Channel Representation, Proceedings of the Tenth International Conference on World Wide Web, Apr. 2001, pp. 376-385.

Mishchenko, Alan. "An Introduction to Zero-Suppressed Binary Decision Diagrams" Jun. 8, 2001, Department of Electrical Engineering Portland State University. pp. 1-15.

"Array". Microsoft Computer Dictionary, Fifth Edition. May 1, 2002.

Aloul, F., M. Mneimneh, and K. Sakallah "ZBDD-Based Backtrack Search SAT Solver" International Workshop on Logic Synthesis (IWLS), New Orleans, Louisiana, pp. 131-136, 2002.

Moller, J., HR Andersen, H Hulgaard, "Product Configuration over the Internet presented at ",The 6th INFORMS Conference on Information Systems and Technology, Nov. 3-4, 2001, Miami Beach, Florida.

Moller, Jesper, "Configuration and E-commerce", IFORS Jul. 2002.

Minato, S., "Zero-Suppressed BDDs and Their Applications", International Journal on Software Tools for Technology Transfer, vol. 3, No. 2, pp. 156-170, Springer, May 2001.

USPTO; PCT/US2003/08265; International Search Report and Preliminary Examination Report; Aug. 13, 2003.

Jacobi et al; Generating Prime and Irredundant Covers for Binary Decision Diagrams; Design Automation, 1992; Proceedings 3rd European Conference; Mar. 1992; pp. 104-108.

European Patent Office; PCT/US2007/079793; International Search Report and Written Opinion; Feb. 7, 2008.

European Patent Office; PCT/US2007/079797; International Search Report and Written Opinion; Feb. 7, 2008.

USPTO; File History U.S. Appl. No. 10/950,622 to Huelsman et al., filed Sep. 28, 2004.

USPTO; File History U.S. Appl. No. 10/950,809 to Huelsman et al., filed Sep. 28, 2004.

USPTO; File History U.S. Appl. No. 10/950,815 to Huelsman et al., filed Sep. 28, 2004.

USPTO; File History U.S. Appl. No. 11/527,637 to Huelsman et al., filed Sep. 27, 2006.

USPTO; File History U.S. Appl. No. 11/527,638 to Huelsman et al., filed Sep. 27, 2006.

European Patent Office; PCT/US2007/079793; International Preliminary Report on Patentablility; Mar. 2009.

European Patent Office; PCT/US2007/079797; International Preliminary Report on Patentablility; Mar. 2009.

Stolowitz Ford Cowger LLP; Related Case Listing; Jun. 24, 2010; 2 Pages.

European Patent Office; Supplemental Search Report, EP 03716683.2; Jul. 2, 2010; 3 Pages.

F. Somenzi: CUDD:CU Decision Diagram Package; http://vlsi.colorado.edu/~fabio/CUDD/nodel.html, site visited Jun. 11, 2009.

USPTO; File History U.S. Appl. No. 11/527,638 to Huelsman et al., filed Sep. 27, 2006; Aug. 2009.

USPTO; File History U.S. Appl. No. 11/527,637 to Huelsman et al., filed Sep. 27, 2006; Aug. 2009.

USPTO; File History U.S. Appl. No. 10/950,622 to Huelsman et al., filed Sep. 28, 2004; Aug. 2009.

USPTO; File History U.S. Appl. No. 10/950,809 to Huelsman et al., filed Sep. 28, 2004; Aug. 2009.

USPTO; File History U.S. Appl. No. 10/950,815 to Huelsman et al., filed Sep. 28, 2004; Aug. 2009.

* cited by examiner

Advice

```
Pricing X
 - ☑ Discount
 + ☐ Premium
 + ☐ Regular
```
12

Pending Choice

```
Pricing
 + ⊙ Please make a selection
 - ○ Discount
 + ○ Premium
 + ○ Regular
```
14

FIG. 1

| Pricing | Services | Shipper |
|---|---|---|
| - ☐ Discount | + ☐ 2-day | + ☐ DHL |
| + ☑ Premium | + ☑ Ground | + ☐ FedEx |
| + ☐ Regular | + ☑ Overnight | + ☑ UPS |

22 — Premium; 26 — Ground; 28 — Overnight; 29 — DHL; 24 — UPS

FIG. 2

|  | A4E1 | A4E2 | A4E3 | A4E4 | A4E5 |
|---|---|---|---|---|---|
| A2E1 |  | ✓ | ✓ |  |  |
| A2E2 | ✓ | ✓ | ✓ |  | ✓ |
| A2E3 | ✓ |  | ✓ | ✓ | ✓ |
| A2E4 |  |  |  |  |  |
| A2E5 | ✓ |  | ✓ |  | ✓ |

Fig. 6

| | Attributes | Rule clicks. |
|---|---|---|
| Rule 1 | Attr1 ↔ Attr2 ↔ Attr3 | (A3E2 • A2E3) × {A1E1, A1E2, A1E3, A1E4, A1E5} |
| Rule 2 | Attr4 ↔ Attr2 | A4E5 × A2E1, A4E4 × A2E2, A4E3 × A2E3, A4E2 × A2E4, A4E1 × A2E5 |
| Rule 3 | Attr4 ↔ Attr1 | A4E1 × A1E1, A4E2 × A1E2, A4E3 × A1E3, A4E4 × A1E4, A4E5 × A1E5 |
| Rule 4 | Attr1 ↔ Attr2 | A1E4 × A2E1, A2E2, A2E3, A2E4, A2E5 |

Fig. 9

| 46 ↙ | Rule 1 | | | | |
|---|---|---|---|---|---|
| | A2E1 | A2E2 | A2E3 | A2E4 | A2E5 |
| A1E1 | | | | | |
| A1E2 | | | | | |
| A1E3 | | | | | |
| A1E4 | Ⓧ | Ⓧ | Ⓧ | Ⓧ | Ⓧ |
| A1E5 | | | | | |

| 48 ↙ | Rule 2 |
|---|---|
| | |
| A1E1 | |
| A1E2 | |
| A1E3 | |
| A1E4 | Ⓧ |
| A1E5 | |

RULE PROCESSING METHOD, APPARATUS AND COMPUTER-READABLE MEDIUM TO PROVIDE IMPROVED SELECTION ADVICE

CROSS-REFERENCE TO RELATED PATENTS AND PATENT APPLICATIONS

This application is a division of U.S. application Ser. No. 10/950,815, filed Sep. 28, 2004, now issued as U.S. Pat. No. 7,552,102, which claims priority to U.S. provisional application Ser. No. 60/506,156, filed Sep. 29, 2003, which are incorporated herein.

This invention is also related to U.S. patent application Ser. No. 10/101,151, now issued as U.S. Pat. No. 6,965,887, and to U.S. patent application Ser. No. 10/101,154, now issued as U.S. Pat. No. 7,188,091, each filed on Mar. 20, 2002 in the names of the same inventors hereof (hereafter "the parent applications"), which are incorporated herein.

BACKGROUND

This invention relates to a rule processing, but more specifically to a method, apparatus, and computer-readable medium that provides selection advice during rule processing utilizing a binary decision diagram (BDD) or zero-suppressed binary decision diagram (ZDD) to express a rule model.

In the referenced, incorporated applications, advice provided by results of rule processing guides an end user in at least two ways. First, conflict advice may be provided to indicate compatibility of user selection(s) regarding components of a product or service. Second, to help guide the user to achieve compatibility, selection advice may be provided to indicate alternative selection(s) that would render the result compatible and/or incompatible relative to the selected components.

To provide greater convenience to the user when using a rule processing system or method, it is desirable to provide more user-friendly interface to obtain results more rapidly. For example, instead of limiting user selection to a single set of possible specifications, it is desirable to enable the user to specify simultaneously many alternative specifications and to provide at the same time multiple possible selections from which the user may choose. In addition, it is also desired to speed execution of a results determination by eliminating nonessential information in the rule set, as determined by user selections.

Thus, the improvements herein primarily relate to selection advice provided to the user during rule processing.

SUMMARY

According to a first aspect of the invention provides, a computer-implemented method of providing selection advice in a rule processing system to help guide a user in selecting desired specifications of a product or service characterized by a ZDD rule model having one or more Include or Exclude rules comprises displaying on a monitor or other I/O device multiple attributes having multiple enumerations that identify possible feature, specifications, or conditions of the product or service; selecting via a user interface multiple alternative enumerations of the attributes; determining a selection advice for each of the enumerations selected in said selecting step; combining (such as by logically OR'ing) the selection advice for the enumerations determined in the determining step in order to produce a result; communicating to an end user (such as a customer or consumer of the product or service) the result generated in the combining step; and then using the result to choose a product or service having desired compliant specifications. The determining step may include, for each attribute having multiple enumerations selected, forming a ZDD tree having nodes respectively associated with selected enumerations; and intersecting the tree thus formed with a MakeSelectionTermForGroup ZDD tree used by said rule processing system to determine selection advice. A keyboard and/or pointing device may comprise the I/O device.

According to another aspect of the invention, in a rule processing method utilizing a ZDD rule model to define compliant features characterized by attributes and enumerations of a product or service, there is provided a computer-implemented method of providing selection advice to help guide a user choose among compliant features characterized by multiple rule components of the ZDD rule model that are related to a central rule component, e.g., a hub in a hub and spoke relational environment, comprising the steps of identifying the central rule component having a pending value of an enumeration not yet selected by a user, determining selection advice for the rule model based on possible selections of enumerations of other attributes related to the central rule component, displaying results of the selection advice based on possible selections of enumerations, and using the results to choose among enumerations that render specifications of the product or service compliant. The determining step of this method may further include combining an attribute relations ZDD representative of the central rule component with an attribute relations ZDD of the ZDD rule model. In addition, where the central rule component has a mutually exclusive Exclude relationship with another rule component, the determining step may further include assigning a negative selection value to other rule components related to the central rule component when a negative selection is denoted for the another rule component. Moreover, where the central rule component for which a selection is pending relates to other rule components through an Exclude relationship, the determining step may include propagating a negative selection value to a rule component under examination when other components related to the centralrule component also has a negative value asserted. Other aspects include searching through Exclude rules to remove non-essential information by removing covers detected therein and/or searching through Exclude rules to detect and remove cyclic covers whereby to reduce the complexity of the Exclude rules.

According to another aspect of the invention, there is provided an apparatus that provides selection advice to help guide a user choose a product or service having desired specifications, where the product or service is characterized by a ZDD rule model having one or more Include or Exclude rules, comprising a user interface to display multiple attributes having multiple enumerations that identify possible specifications of the product or service; an I/O device to enable a user to choose multiple alternative enumerations of the attributes in response to display of the attributes and enumerations; and a processor to determine alternative selection advice for each enumeration selected by the user, to combine multiple ones of said selection advice for each enumeration determined thereby to produce a result indicative of selections compliant with the enumerations selected by the user, to communicate the result to the user, and to enable the user to obtain a product or service having desired compliant specifications. The processor, for each attribute having multiple enumerations selected, may also generate a ZDD tree having nodes respectively associated with selected enumerations and to intersect the ZDD tree thus generated with a MakeSelectionTermForGroup ZDD tree used to determine selection advice.

According to yet another aspect of the invention, there is provided for use in a computer-implemented rule processing system that uses a ZDD rule model having multiple ZDD rule components to define compliant specifications of a product or service, a computing device programmed to provide selection advice to guide a user choose compliant specifications where the rule components are related to a common one of said multiple rule components. Such computing device comprises an I/O interface to receive inputs from and to communicate results to the user in response to user selections; and a processor having program instructions to effect acquisition of inputs from the user, to identify a common rule component of the ZDD rule model having a pending selection of an enumeration, to determine selection advice based on alternative selections of enumerations of other attributes related to the common rule component, and to provide the results to a user via the I/O interface thereby to enable the user to choose a product or service having compliant specifications according to the alternative choices of enumerations. The computing device may additionally include program instructions to combine an attribute relations ZDD for the common rule component with an attribute relations ZDD for the ZDD rule model. In addition, where the common rule component has a mutually exclusive Exclude relationship with at least one other rule component, the processor may include program instructions to assign a negative selection value to other rule components related to the common rule component when a negative selection is denoted for the one other rule component. When the common rule component for which a selection is pending relates to other rule components by an Exclude relationship, the processor may include program instructions to propagate a negative selection value to a rule component under examination when other components related to the common rule component also have a negative value asserted. In addition, the processor may include program instructions to effect searching through Exclude rules to remove non-essential information by removing covers detected, or to detect and remove cyclic covers whereby to reduce the complexity of the Exclude rules and/or to reduce processing time.

According to yet another aspect of the present invention, there is provided a computer-readable medium comprising program instructions to implement rule processing in a computer to provide selection advice that guides a user in selecting features of a product or service characterized by a ZDD rule model having one or more rule components; to display multiple attributes having multiple enumerations that identify possible features of the product or service, to enable the user simultaneously to select multiple alternative enumerations of the attributes, to determine selection advice separately for each enumeration selected by the user, to combine by OR'ing or otherwise the selection advice of each enumeration determined thereby to produce a result, and to communicate the result to a user whereby to enable the user to choose a product or service having compliant features. The program instructions may also generate, for each attribute having multiple enumerations selected, a ZDD tree having nodes respectively associated with enumerations selected by the user and to intersect the tree thus generated with a MakeSelectionTermForGroup ZDD tree used by the ZDD rule model to determine selection advice.

In yet another aspect of the invention, there is provides a computer-readable medium for use in a computer-implemented rule processing system utilizing a ZDD rule model to define compliant features including attributes and enumerations of a product or service where the medium includes program instructions operative to provide selection advice to help guide a user to select a desired set of compliant features characterized by multiple rule components of the ZDD rule model related to a common or central one of the multiple rule components but not necessarily related to each other, to identify a common one of the rule components having a pending selection of an enumeration, to determine selection advice for the rule model based on possible selections of enumerations of other attributes related to the common or central one of said rule components, and to communicate to the user selection advice based on possible selections of enumerations whereby enable a user to choose among enumerations that render features of the product or service compliant. The program instructions may also effect combining of an attribute relations ZDD of the common central one of the rule components with an attribute relations ZDD of the ZDD rule model. In addition, where the common rule component has a mutually exclusive Exclude relationship with one other rule component, the computer-readable medium may also include program instructions to assign a negative selection value to other rule components related to the common rule component when a negative selection value is denoted for another interrelated rule component. Also, where the common rule component for which a selection is pending relates to other rule components through an Exclude relationship, the computer-readable medium may further include program instructions to propagate a negative selection value to a rule component under examination when other components related to the common rule component have negative advice asserted. Further, the medium may include program instructions to effect searching through Exclude rules to remove nonessential information by removing covers detected, to detect and remove cyclic covers whereby to reduce the complexity of the Exclude rules.

Yet another aspect of the invention comprises, for use in a computer-implemented rule processing system that employs a ZDD rule model having multiple ZDD rule components to define compliant conditions of a rule-based system, a computing device programmed to provide selection advice that guides a user in selecting compliant ones of the conditions. In the case where the rule components are related to a common one of multiple rule components, the device comprises an I/O interface to receive inputs from and to communicate results to the user in response to user selections; and a processor having programs instructions to effect acquisition of inputs from the user, to identify a common rule component of the ZDD rule model having a pending selection of a condition, to determine selection advice for alternative selections of conditions of other attributes related to the common rule component, and to provide results to a user via the I/O interface thereby to enable the user to choose compliant conditions of the rule-based system according to multiple alternative choices of conditions.

Other aspects and features of the invention will become apparent upon review of the following description of an illustrative embodiment taken in connection with the accompanying drawings. The invention, though is pointed out by the appended claims.

BRIEF DESCRIPTION OF THE DRAWINGS

FIG. 1 shows exemplary results graphically displayed on a computer monitor in the form of Advice and Pending Choice based on user selections of attributes and/or enumerations of an exemplary ZDD rule model.

FIG. 2 is a GUI display of attributes and enumerations of a service that may be selected by a user.

FIG. 6 shows an exemplary Include rule diagram having an exclude "cover" that is identified and removed during rule processing according to an aspect of the present invention.

FIG. 9 is an exemplary rule definition table specifying a relationship between and among four rules.

FIG. 11 shows a rule diagram having Exclude cover, and a corresponding reduced rule diagram with the cover eliminated.

FIG. 13 illustrates the presence of an inherent cyclic cover brought about by unique selections in a set of three rule components (represented by two-dimensional diagrams) as well as a resulting, reduced rule component (also represented by a two-dimensional rule diagram).

DESCRIPTION OF ILLUSTRATIVE EMBODIMENTS

Figure 3:
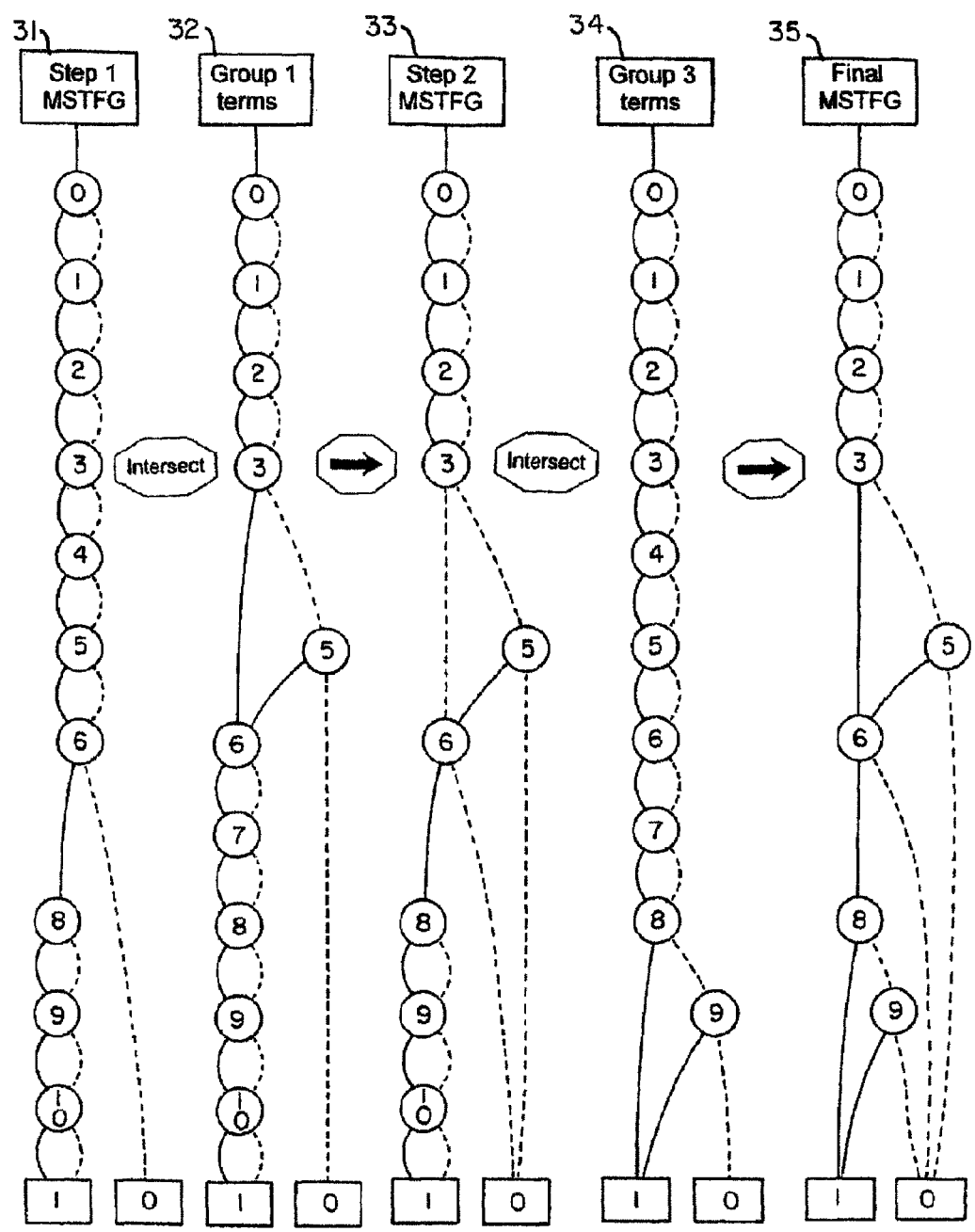
FIG. 3 illustrates a process of building the modified MSTFG Zdd tree that is used during processing of the ZDD rule model characterizing the product, service, or rule-based system under examination.

FIG. 1, for example, shows such results graphically displayed on a computer display monitor in the form of Advice and Pending Choice based on user selections of attributes and/or enumerations of an exemplary rule model. Attributes and enumerations correspond to product components and/or features or properties thereof. Advice shown in pane 12 indicates a conflict for discount pricing, denoted "X," based on selections chosen by the user. Pane 14 displays selection advice, which indicates plus and minus signs of alternative selections (e.g., discount, premium, and regular) that render the result of pane 12 compliant or non-compliant based on the user selections. User selection of a "plus" enumeration (i.e., premium or regular) of the pricing attribute renders the result compliant while selection of a "minus" enumeration renders the result non-compliant. Selection advice is predictive, that is, selection advice informs the user that conflict will be encountered if a negatively marked selection is chosen and that changing a choice from a negatively marked selection to a positively marked selection will eliminate an existing conflict.

Pending Choice pane 14 shows the same pricing attribute with the pending choice feature enabled. In this example, the pricing attribute has not been assigned an actual value because the user has not yet made a choice from one of the actual values.

I. Include Selection Advice

Three situations may exist for which selection advice for logic expressed in Include rules of a ZDD rule model may not match the expectations of end users. Two of these situations involve computation of advice when one or more attributes were pending, that is, had no selection by the user.

A. Multi-OR Select for an Attribute

A first situation concerns what happens when a user selects multiple enumerations for an attribute. The improvement herein called Multi-OR Select for an Attribute computes advice in this scenario and allows a user to affirmatively select multiple enumerations for a single attribute when specifying a product or service (e.g., choosing product specifications). The resulting advice is the OR of all of the individual advises for the enumerations. Further, many attributes can have multiple enumerations selected without causing execution time to increase in an exponential manner.

FIG. 2 shows enumerations that may be selected for three attributes: Pricing, Services, and Shipper. Pricing and Shipper attributes each show a single selection, denoted by checkmarks in boxes 22 and 24. The Services attribute shows multiple user selections in boxes 26 and 28. In this example, all three attributes are directly related to each other so, in this case, a determination of the advice by the rule processing system or method for the Shipper attribute must take into account the values for Services and Pricing attributes. When considering the values for Services, the impact of the selection 26 of Ground is OR'ed with the impact of the selection 28 of Overnight. That is, a "+" is assigned to DHL selection 29 of the Shipper attribute if either Ground or Overnight is compatible. This allows computation of advice to remain linear (non-exponential) regardless of the number of attributes or enumerations (i.e., selections) chosen by the user.

Exemplary code for processing the Multi-OR Select function is set forth in the Appendix. When a user selects several enumerations related to an attribute, the result is OR'ed together. For example, if the user chooses Red and Green from a Color attribute, the Advice result shows options for Red and options for Green at the same time. Some of the results shown apply only to Red and some of the results apply only to Green. This would differ from a Multi-AND result, which would only show the results that are true for both Red and Green simultaneously. In order to support Multi-OR select, certain modification to the Execution engine disclosed in the incorporated applications were implemented.

As set forth in the Appeneix, one change concerns building the Include MakeSelectionTermForGroup (MSTFG) Zdd. The MSTFG Zdd is preferably constructed synthetically. Attributes having a single enumeration selected are added, as before. For attributes having multiple enumerations selected by the user, the method or system implementing the method starts with a one tree, and then, for each related attribute, each selected enumeration is added to a tree in an exclusive manner. The method (or apparatus) then intersects this tree into the MSTFG. The Include Select operation remains unchanged. Only the MSTFG tree changes on the Include side. Processing multiple enumerations has a minimal performance impact for enumerations that are on the Include side of the overall rule model characterizing the product or service in question.

Procures to implement Exclude advice with multiple selected enumerations is also provided. Here, the improved method and apparatus include changes to Exclude advice processing that allow the user to select multiple enumerations of a single attribute. One solution involved performing the SelectE operation on all possible combinations of the multiple selected enumerations. This had a negative impact on performance. Handling of multiple selected enumerations has been integrated into the new exclude advice changes.

As an example of using two Include attributes with multiple enumerations, several values for pressure and material in the following group-index chart were chosen to illustrate which material enumerations are set.

| Group | | Index | |
|---|---|---|---|
| Number | Name | Number | Nama |
| 0 | Material | 0 | Rubber |
| | | 1 | Silicone |
| | | 2 | Neoprene |
| 1 | Pressure | 3 | Low |
| | | 4 | Medium |
| | | 5 | High |
| 2 | pH | 6 | Acidic |
| | | 7 | Basic |
| 3 | Thickness | 8 | 0-25 mm |
| | | 9 | 25-50 mm |
| | | 10 | 50-75 mm |

In the above example, the following enumerations were selected for pressure, thickness and pH attributes:

Pressure: High AND Low.

Thickness: 0-25 mm AND 25-50 mm.

pH: Acidic.

Thus, the user chose enumerations 3, 5 from group 1; enumeration 6 from group 2; and enumerations 8, 9 from group 3.

FIG. 3 illustrates building the modified MSTFG Zdd tree. First, since the user selection from Group 2 only has one enumeration, it can be synthetically added as performed by the method and/or apparatus of the parent applications to produce the Zdd tree 31 shown in FIG. 3. Then, tree 32, indicated as Group 1 terms, is constructed using the two terms selected for Group 1. Then, trees 31 and 32 are intersected to produce tree 33, indicated as Step 2 MSTFG. Next, tree 34 is generated, indicated as Group 3 Terms, similar to the procedure for the Group 1 terms. Finally, trees 33 and 34 are intersected to produce tree 35, indicated as the Final MSTFG Zdd. The Final MSTFG Zdd is used by the Include Select operation set forth in the parent applications.

B. Hub and Spoke Look-Ahead

A second Include advice situation involves the effect that a pending attribute has on attributes related by include rules. Hub and spoke deals with the situations where several spoke attributes are related to a central hub attribute. The spokes are not directly related to each other (i.e. they aren't in the same rule). If the hub attribute is not pending (i.e., unknown or not yet selected by a user), advice is solved as normal. The following method is used to obtain advice if the hub attribute is pending (i.e., selected by a user or otherwise known). In order to solve the validity for any one of the spoke attributes, it must be determine what other spoke attributes are related to it through the pending hub attribute. Newly found related spoke attributes are temporarily added to the AttrRels ZDD for the spoke attribute.

Example:

Rule 1: Attr1↔Attr2

Rule 2: Attr2↔Attr3

Rule 3: Attr2↔Attr4

Rule 4: Attr2↔Attr5

In the above example, Attr2 is a hub because all of the other attributes are directly related to it. If Attr2 is pending, we need to imply the relationships that Attr1 has to the other spokes of Attr2. This is done by adding Attr3, Attr4, and Attr5 to the AttrRels for Attr1, which forces Attr2 into a required state. That is, although Attr2 is pending, it will still be considered during the logic evaluation. Improvements described in the "Select Exclude" section of the Appendex are used to implement this feature.

The Hub and Spoke Look-Ahead routine works by modifying groups that are related to the group for which advice is sought. C++ code was added to the BddSelectionInclude routine to do this. The attrRels array was then used as before by the Select and MakeSelectionTermsForGroup.

Figure 4:
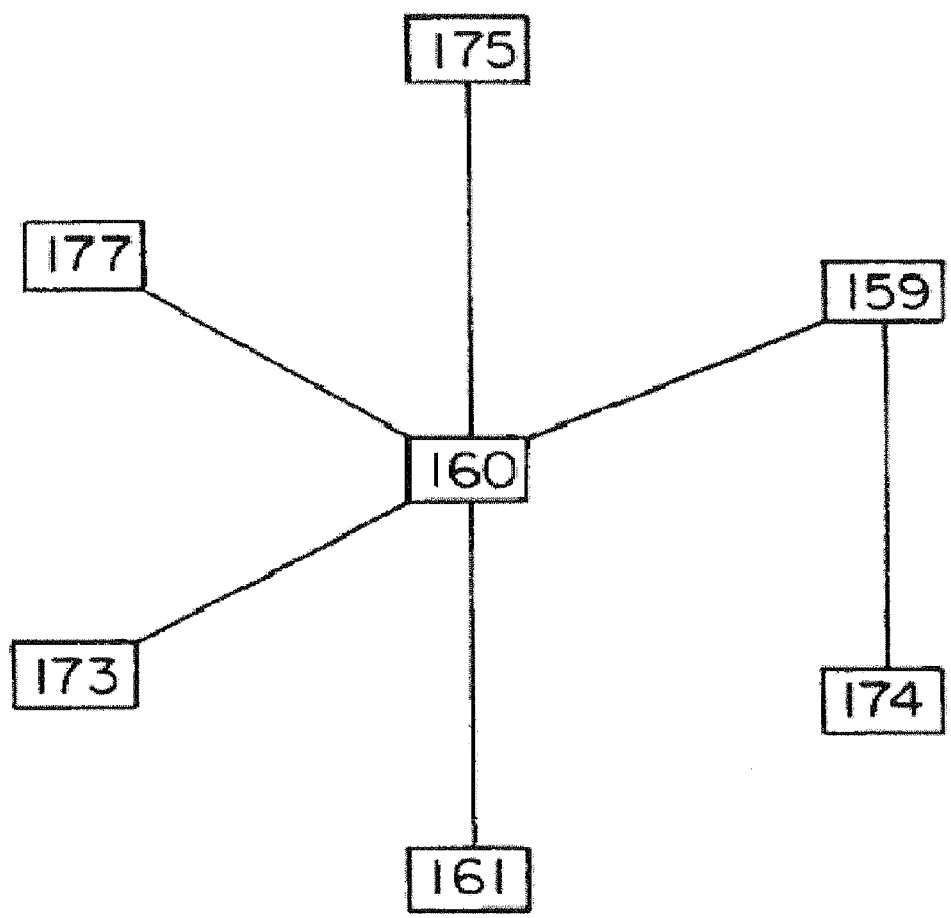
FIG. 4 illustrate a hub and spoke relationship of rule components where multiple spoke components relate to a central or common one of rule components in an interrelated set.

Referring to FIG. 4, the hub and spoke concept deals with cases where several spoke attributes 159, 161, 173, 175, and 177 are related to a central hub attribute 160. The spokes attributes are not directly related to each other (i.e. they aren't in the same rule). As shown in FIG. 4, Attributes 159 and 174 are directly related. Attributes 161 and 173 are indirectly related through attribute 160. Attribute 160 is the hub through which the spokes, 159, 161, 173, 177, and 175 are all indirectly related.

If the hub attribute 160, for example, has been assigned a value (i.e. the user has made a selection), determination of advice is made as normal. Normal advice computation considers direct relationships. In FIG. 4, advice for attribute 159 would take into account (i.e., use the values for) attributes 160 and 174.

The improvement relating to Hub and Spoke Look-Ahead increases the accuracy of the advice determination by increasing the number of attributes that are considered during the computation of advice when the hub attribute (160) is pending (has not been assigned a value). If attribute 160 is pending, then certain indirect relationships are also used to compute advice. To compute advice for attribute 159, attribute 174 would be considered due to the direct relationship. Attributes 161, 173, 177, and 175 would be considered due to the indirect relationship through the pending, hub attribute 160.

For clarity, computing advice for attribute 161 is presented here. When attribute 160 has a value, then normal advice is used and only direct relationships are considered. Attribute 161 is directly related to only attribute 160, so only attribute 160 is considered when computing advice for attribute 161. When attribute 160 is pending, then the indirect relationships of 160 are also considered. So, attributes 159, 173, 177, and 17D would also be considered when computing advice for attribute 161

Hub and spoke look ahead takes place during the processing of Include relationships. Similar handling of pending choices takes place during the processing of Exclude relationships but is dispersed throughout the algorithm.

In the following example, four (4) attribute relation rules with a user-selection in Attr1 only where Attr(x) (x=1, . . . 5) are related:

Rule 1: Attr1↔Attr2

Rule 2: Attr2↔Attr3

Rule 3: Attr2↔Attr4

Rule 4: Attr1↔Attr5

Figure 5:
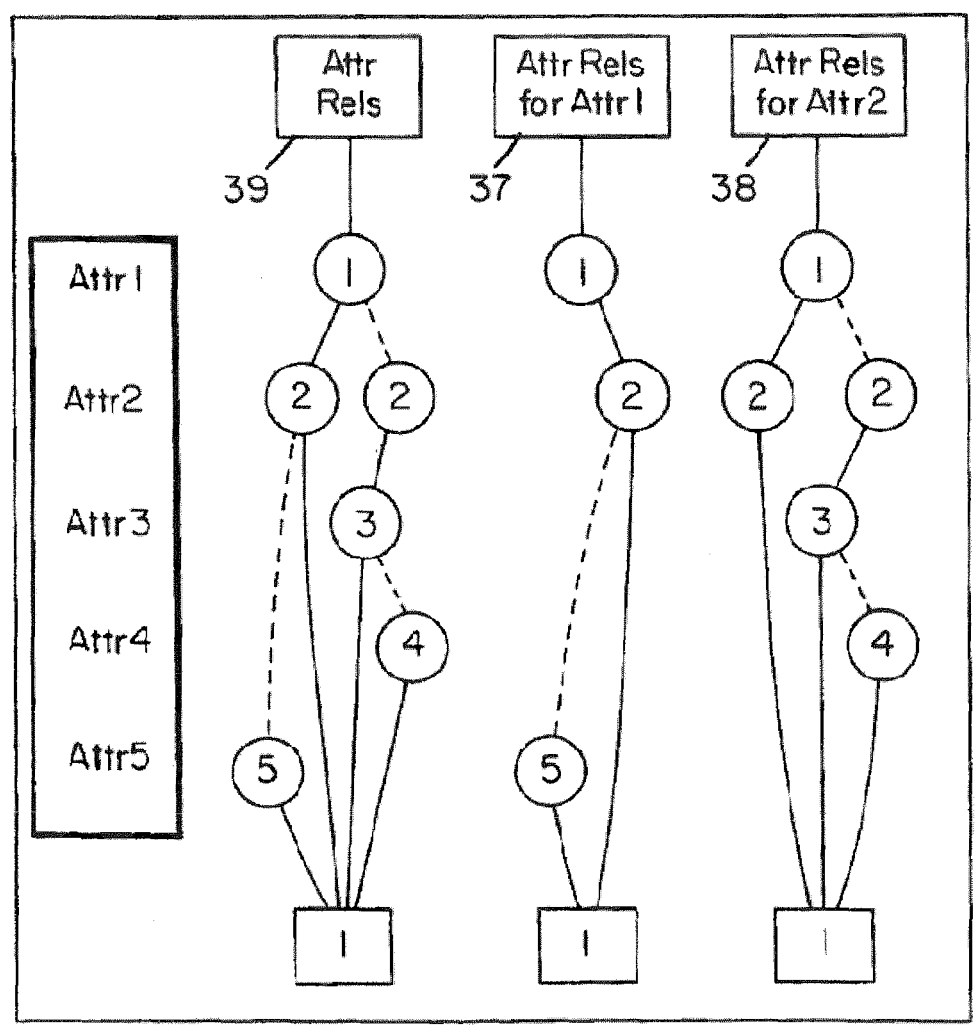
FIG. 5 shows exemplary Zdd diagrams attribute relations used to obtain selection advice according to improvements of the present invention.

In FIG. 5, Zdd diagram 37 shows the relationship of Attr1 above while Zdd diagram 38 shows the relation of Attr2. In this example, Attr2 is a pending hub for Attr1 because it is related to Attr1 and other attributes, and because it is pending. Normally, Attr1 is only related to Attr2 and Attr5. Since Attr2 is pending, we need to add the AttrRels for Attr2 to the AttrRels for Attr1 is related to Attr1, Attr3 and Attr4. So, adding these two AttrRels together yields result Zdd 39 that Attr1 is related to Attr2, Attr3, Attr4, and Attr5.

The reason for this is to force Attr2 into a required state. That is, although Attr2 is pending, we must still use it as if at least one of its enumerations has a value during the Include logic execution.

C. Pending Never Enumerations

A third Include advice situation deals with interaction between pending choices and enumerations that can never be chosen without creating conflict. In some cases, the advice for pending attributes may not have been entirely accurate. Enumerations that were never used, for example, may show up as '+' if they were pending. To resolve possible inaccuracies, the method, apparatus, or computer-readable medium of the present invention involves checking if any enumerations in a pending attribute are contained in the Include zdd of the overall rule model characterizing the product or service in question. If they are not in the Include zdd and some other enumerations from the same attribute were in the Include zdd, then the enumeration is never included. The never used enumerations in the Include zdd are then forced to be zero at the beginning of the execution engine.

If an attribute is never used in the Include zdd but resides in the Exclude zdd, it is seen as an "always asserted" from the perspective of the include zdd. That means that all of its enumerations were forced to be "one" while processing the include zdd. The improvement affects how the conflict advice is displayed when attributes are pending.

In exemplary code for groups that are pending, the improvement checks if there are any enumerations that are never used. The following code is added to the GetAdviceArray routine just before the Include advice section.

```
for( int groupIndex = 0;
groupIndex < engine.oZDD1.nGroups; groupIndex++ )
{
    if( engine.iGroupState[groupIndex] == 1 )     // Is Pending?
    {
        int groupStart =
engine.oZDD1.aGroups[groupIndex*engineoZDD1.GroupItemLength];
        int groupEnd = engine.oZDD1.aGroups[groupIndex*engine.-
oZDD1.GroupItemLength + 1];
        for( int a = groupStart; a<=groupEnd; a++ )
        {
            engine.iCurrState1[a] = engine.oZDD1.isNever[a]?0:1;
        }
        break;
    }
}
```

FIG. 6 shows an exemplary Include rule having an exclude "cover" on A2E4. A cover exists when a rule does not include any valid combinations associated with the rule, such as with A2E4 in the example of FIG. 6. This is illustrated by the absence of a relation in row 41. A2E4 can never be selected without creating conflict because all rule combinations containing A2E4 are invalid. Therefore, the selection A2E4 should always yield negative selection advice.

The present improvement concerns avoiding assignment a positive selection advice to A2E4 when related attributes were pending (had no user selections). If A2E4 was selected, a correct validity would be indicated but the advice may be incorrect.

To avoid providing incorrect advice relative to a cover, the improvement checks the Include ZDD during packaging and notes enumerations that are completely missing from the Include ZDD. If an enumeration is missing from the Include ZDD and some members of the group to which it belongs are in the Include ZDD, then the enumeration is never valid as a selection. Such never valid selections receive negative selection advice. At the beginning of Include advice processing, never valid selections are set to invalid.

a. Exclude Selection Advice

Certain situations existed for which selection advice for logic expressed in Exclude rules did not match the selection advice for equivalent logic expressed in Include rules. The difference is manifested in two ways. First, the advice from exclude-based logic would place plus signs on selections that would receive minus signs with Include based logic.

Second, an end user might occasionally choose a selection with positive selection advice and the execution engine would respond by changing the advice for that selection from positive to negative and then show conflict. In these situations, selection advice from include rules more closely matched the expectations of end users so the improvement deals with modifying the processing of exclude rules.

i. Exclude Mutually Exclusive Attributes

A first situation involves the effect an exclude rule has on other related attributes. If a set of enumerations are excluded and every enumeration in that set is selected, the improvement may exclude every other attribute that is related to any of the attributes that were excluded.

Example Using Three Exclude Rules.

Rule 1: Attr1↔Attr2↔Attr3↔Attr4. (Various excludes)
Rule 2: Attr5↔Attr6↔Attr7. (Various excludes)
Rule 3: Attr1↔Attr5. Enum11×Enum55

If Enum11 and Enum55 are selected, combinations are completely excluded. Therefore all enumerations are excluded from attributes that are related to Attr1 and Attr5. That means that all enumerations from Attr2, Attr3, Attr4, Attr6 and Attr7 are excluded.

To execute a routine for Exclude Pending Relationships, as set forth in the Appendix, every path of the Exclude rule that has a selection and/or pending terms is scanned. As a path is scanned, the terms on that path are categorized. The improvement searches for the following cases:

Paths with only selected terms. The exclusive attributes for all the terms on this path are excluded.

Paths with only pending terms and selections related to those pending terms. A counting mechanism is used to determine if the related terms are excluded.

Paths only having selections and related pending terms. The counting mechanism is used here as well.

Figure 7:
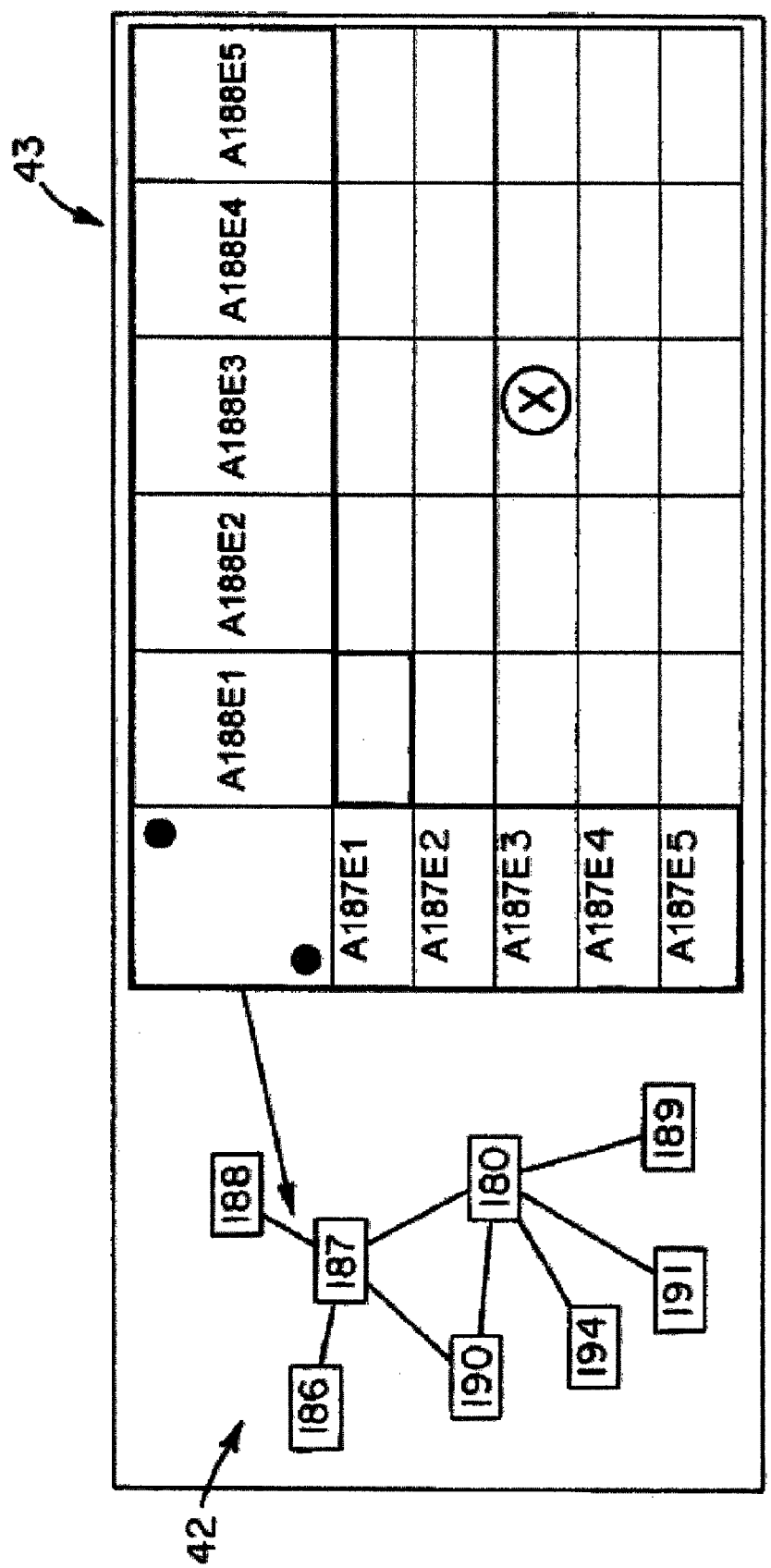
FIG. 7 shows an exemplary attribute relations ZDD and a corresponding a relationship diagram revealing an "exclude" relation between certain attributes of the ZDD helpful in explaining certain aspects of the present invention.

FIG. 7 shows a attribute relations ZDD 42 of a rule model having eight attributes related through various rule components. The attribute relations ZDD 42 shows a relationship among attributes 180, 186, 188, and 190, which are directly related to attribute 187. FIG. 7 also shows a relationship diagram 43 revealing an "exclude" relation between attributes 187 and 188, indicated by an "x" mark in the diagram.

Attribute relations rule 42 shows that a selection of A187E3 is incompatible with a selection of A188E3. If a user selects A187E3, normal selection advice computation provides negative advice for A188E3, and vice versa, which is the correct and expected behavior. However, if both A187E3 and A188E3 were selected, normal selection advice computation would render negative advice for both selections (which is also correct), but would not go on to mark the selections for attributes 180, 186, and 190 with negative advice. All selections for attributes 180, 186, and 190 should be marked with negative advice since these attributes are directly related to attribute 187 and picking any of the selections would not change the existing conflict between A187E3 and A188E3.

Rule processing to implement Exclude Mutually Exclusive Attributes is done by the execution engine at run time. The system scans for this condition at the same time that it scans the Exclude Zdd for pending relationships. When the system scans a path and arrives at the "one" node, it compares the number of terms on the path to the number of selections on that path. If those two numbers are the same, the Exclude Zdd scanner calls a routine that also excludes the mutually exclusive attributes for all of the selections on that path.

Exclude Pending Relationships

Figure 8:
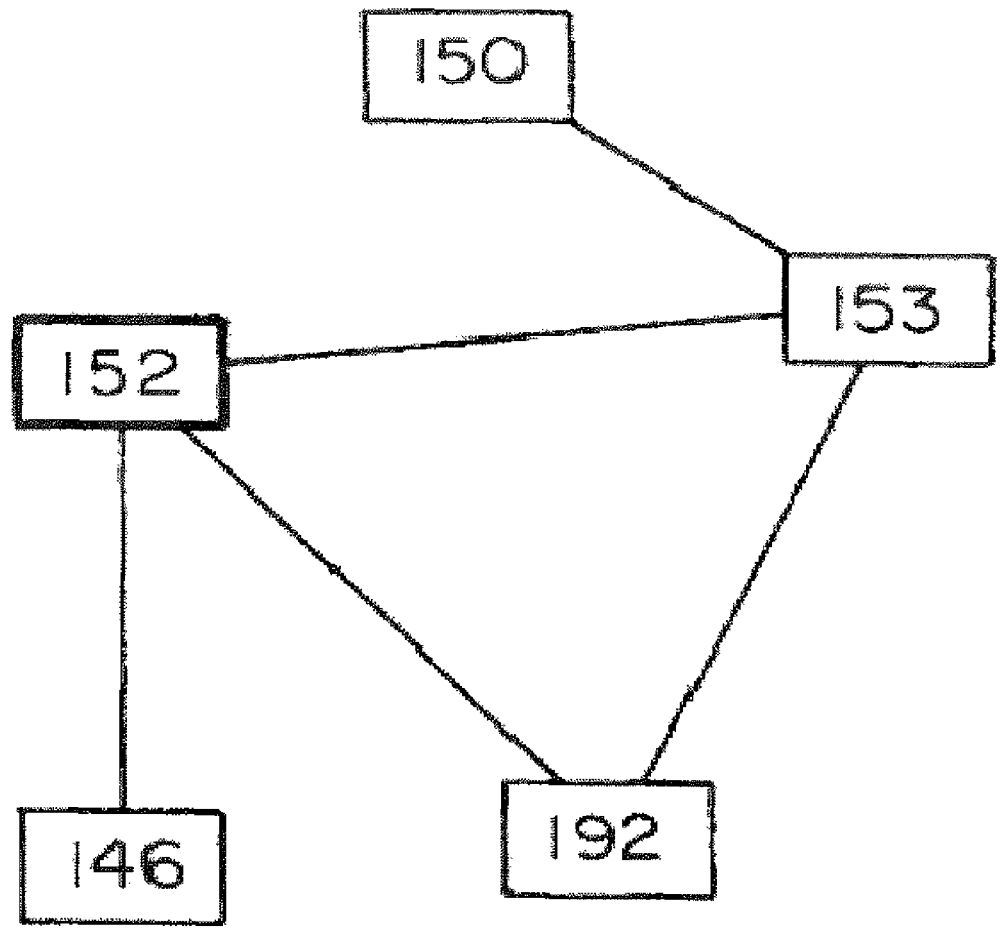
FIG. 8 shows an exemplary relationship between five attributes related through Exclude rules, a shaded one of which has a pending value, e.g., not yet selected by a user.

A second situation involves propagation of negative selection advice across attributes related through Exclude rules when selection of one of the attributes is pending. FIG. 8 shows an exemplary relationship between five attributes related through Exclude rules. In this example, shaded attribute 152 is pending (i.e., has no user selection), the unshaded other attributes have user selections, and advice is to be computed for attribute 146. According to the improvement, an enumeration of attribute 146 will have negative advice propagated towards it based on the composition and lengths of the relevant paths in the exclude Zdd tree.

To implement Exclude Pending Relationships on a computer, the improvement scans or effects scanning of every path of the Exclude ZD having picked and/or pending terms. During the scan, all terms on the path of the ZDD are categorized into one of several cases:

In all cases, the procedure implemented by the method or apparatus seeks to find complete paths through the Exclude Zdd tree. If a complete path is found, all of the terms on that path must be "−" (negatively) advised or denoted. If the path is complete except for an unselected term (not yet picked by a user), then that last term is also negatively advised or denoted as "−."

If the path is complete except for a term and another term from a pending attribute, more processing must be done in order to determine if the term of interest is to be negatively advised.

Paths with picked terms only. The exclusive attributes for all terms on this path are also excluded, which is the triggering event for Mutually Exclusive Attributes, discussed above.

Paths with pending terms only and picks related to those pending terms. A counting mechanism in the procedure is used to determine if the related terms are excluded. This case occurs if an enumeration is related to a pending group and all of the enumerations in the pending group are excluded. In such case, the enumeration can also be excluded. When implementing the procedure, it is not necessary to know how all of the pending enumerations became excluded—the procedure just acts on that fact.

Paths only having picks and related pending terms. The counting mechanism of the procedure is used here as well. This case occurs when an enumeration is related to a pending enumeration and that pending enumeration is excluded through an unknown third enumeration, in which case the improved procedure may exclude the first enumeration. This situation can be tricky because pending term may be excluded by a pick of another term to which it directly relates as well. In this case, the system implementing the procedure doesn't use the pending term in the path.

The procedure used in the preferred method or apparatus also assures that certain requirements are met, e.g., that (1) there can only be one pending enumeration on the path, and (2) the enumerations related to the pending enumeration lie on a path that doesn't contain the picked term and that the related enumerations are not pending.

Figure 10:
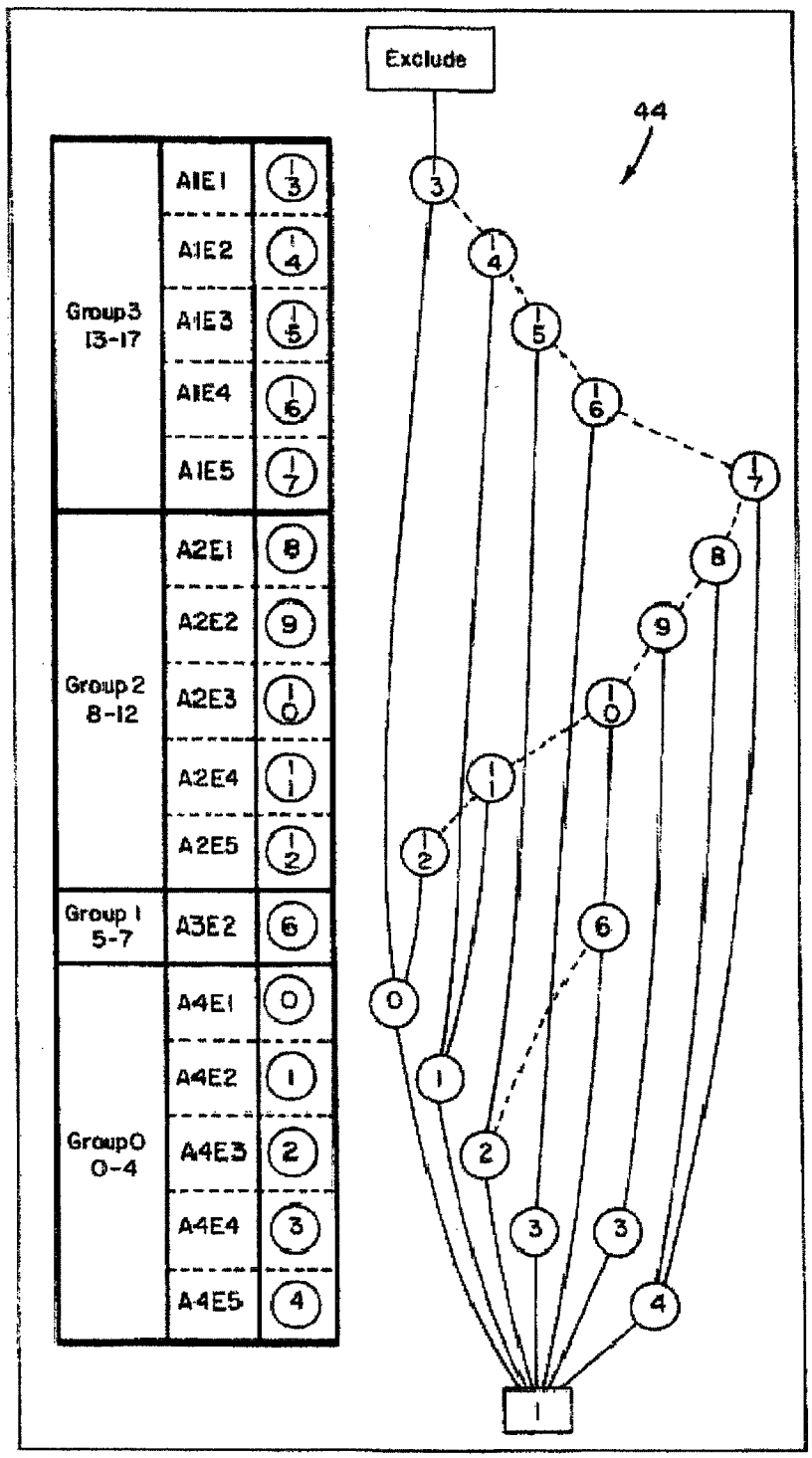
FIG. 10 shows an Exclude ZDD tree having rules defined in the table of FIG. 9.

As an Example of the Exclude Pending Relationships, the Exclude tree 44 of FIG. 10 has rules that are defined in the table of FIG. 9 to illustrate various cases for handling pending attributes. FIG. 9 shows relationships between and among four rules (Rule1, Rule2, Rule3 and Rule4) and four attributes (Attr1, Attr2, Attr3, and Attr4). If a user selects enumeration A4E3 and leaves all the other attributes pending, enumerations A3E2, A2E3, A1E3, A1E4 become excluded. Enumerations A2E3 and A1E3 are excluded directly by rule clicks. A1E4 is always excluded because it is excluded with all members of Group 2. Since there must always be a valid enumeration selected from each group, and since no enumeration from Group 2 can be selected when A1E4 is selected, A1E4 is excluded.

The counting mechanism described above is used to determine that all members of Group 2 are to be excluded with selection of A1E4. Enumeration A3E2 is excluded because A2E3 and A1E4 are both excluded. Note that, at this point, selection of any enumeration having negative advice will cause the attributes related to it to also be excluded. This scenario was described above in connection with mutually exclusive attributes.

Removal of Exclude Cover

Other situations of Exclude Selection Advice improvements concern removing information from the Exclude Zdd that might hide proper advice. Routines for accomplishing this, which is described in the Appendix, are preferably added during the packaging process. Once the covers are removed, the Exclude Zdd is modified, but preferably retaining the same variable ordering. Exclude cover removal is used to create a new Exclude ZDD devoid of nonessential information for logic processing.

The following example of single Exclude rule with three attributes is discussed:

Enum11×(Enum21 . . . Enum25)×Enum33

Attr2 is a cover of Enum11×Enum33.

In this example, if Enum11 is chosen, then Enum33 should be excluded no matter which enumeration of Attr2 is selected. So, the cover on Attr2 as it relates to Enum11 and Enum33 must be removed.

In a triangular Exclude rule, covers must also be removed when combining rules in a triangular manner. This situation occurs when three or more Exclude rules are related in a cycle, such as seen in the following example:

Rule 1: Attr1↔Attr2. Enum11×(Enum21 . . . Enum24)
Rule 2: Attr2↔Attr3. Enum11×(Enum31 . . . Enum34)
Rule 3: Attr3↔Attr1. Enum25×Enum35

Enum11 should always be excluded because it is noncompliant with (Enum21 . . . Enum24) and with (Enum31 . . . Enum34). It is compliant with either Enum25 or Enum35, but since these are noncompliant, Enum11 is not compliant with either one. The three Exclude rules mentioned above can, however, be combined with a larger three-dimensional rule. In that form, it is more obvious that Enum11 would be totally excluded.

When combined into a single rule, the cover can be removed by the previous method. Since combined rules should be avoided, the covers in place must be removed. Exemplary code set forth in the appendix comprises Visual Basic code that shows a call to the RemoveCoversFromExclude routine. This code is inserted at the time when the exclude ZDD is being created and persisted to memory.

To explain further, a third situation occurs when, during rule definition or maintenance, a modeler or rule maintenance personnel creates a cover by excluding an entire row or column of a rule, such as shown by Rule 1 (46) illustrated in FIG. 11. Rule 1 contains an exclude cover in that it excludes any combination of relationships containing A1E4 (i.e., Attribute 1, Enumeration 4). Attribute 2 is referenced by the rule but that reference is not relevant because every one of the five enumerations of Attribute 2 is excluded whenever A1E4 is selected. Thus, the improvement herein relating to Exclude Cover Removal detects conditions like that shown in Rule 1 of FIG. 11 and converts them to that shown in Rule 2 (48), also shown in FIG. 11.

Processing code for the Exclude Cover Removal is shown in the Appendix. Since, during rule packaging, the method, apparatus, or computer-readable medium used to create the Exclude ZDD may leave covers in the ZDD that do not add essential information for the logic computation, exclude covers may be removed.

Figure 12:
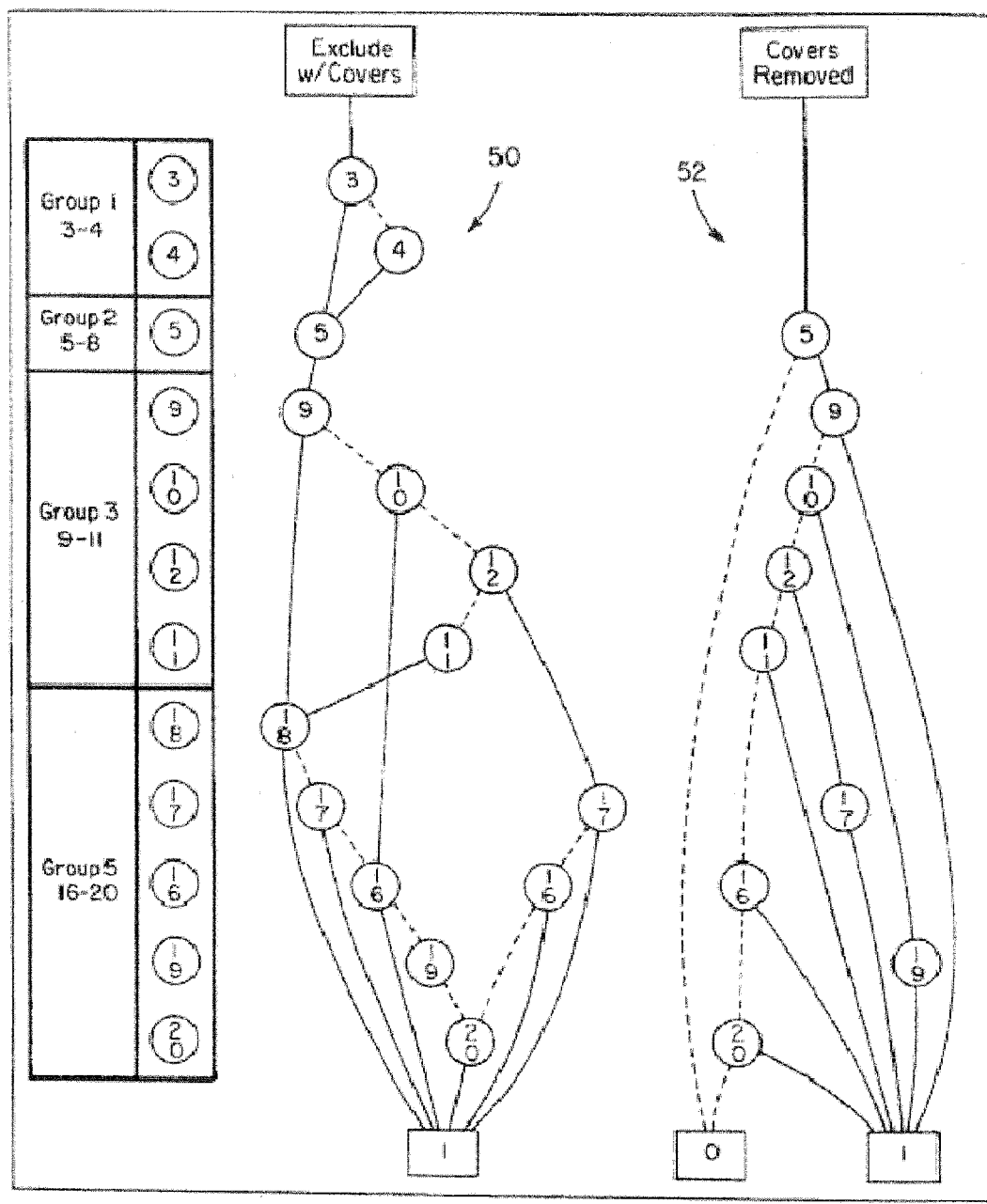
FIG. 12 shows an example of an Exclude Zdd having a plurality of covers as well as a resulting, modified Exclude Zdd after removal of the covers.

FIG. 12 shows an example of an Exclude Zdd 50 having many covers as well as a resulting, modified Exclude zdd 52 after removal of the covers. To remove the covers, the improvement reorders or moves a group of nodes to the bottom of the ZDD tree 50 and any path that enters the completed XOR for the group that was moved to the bottom can be redirected to the "one" node. The next group of nodes is then moved to the bottom of the tree and the process is repeated.

When Group 1, for example, is moved to the bottom of the ZDD, node 3 and node 4 will be an XOR with every other combination in the ZDD. Each combination that uses the XOR can go directly to the "one" terminal node instead of going through the XOR. Since all combinations go through the XOR of nodes 3 and 4, it turns out that the nodes 3 and 4 are removed entirely from the ZDD. Note that there are no nodes in Exclude Zdd 52 that have Index 3 or index 4.

Group 5 is made up of Indexes 16 through 20. When Group 5 is moved to the bottom it is seen that there are various sub-groupings involving Indexes 16 through 20. One of these sub-groupings is a complete XOR on Group 5. The combinations in the ZDD that have this XOR are {node 5-node 9-XOR} and {node 5-node 11-XOR}. The XORs can be removed from these two combinations. So instead of going through the XOR, they go directly to the "one" terminal node. Note that in Exclude Zdd 52 the combinations {node 5-node 9} and {node 5-node 11} both go directly to the terminal 1 node.

Group 3 is made up of indexes 9 through 11. When Group 3 is moved to the bottom of the ZDD one of the sub-groupings will be a complete XOR on Group 3. The combinations that use this XOR are {node 5-node 16-XOR} and {node 5-node 20-XOR}. The XOR can be removed from these two combinations. So instead of going through the XOR, they go directly to the "one" terminal node. Note that in Exclude Zdd 52 the combinations {node 5-node 16} and {node 5-node 20} both go directly to the terminal 1 node.

One complication arises when a cover is removed. Such removal affects removal of later covers from the ZDD tree. So, a copy of the original tree is kept in memory and checked for paths that would have been removed if that group were the first to have its cover(s) removed. The improvement uses the original Zdd tree to facilitate removal of paths.

Cyclic Exclude Rules

Figure 13:
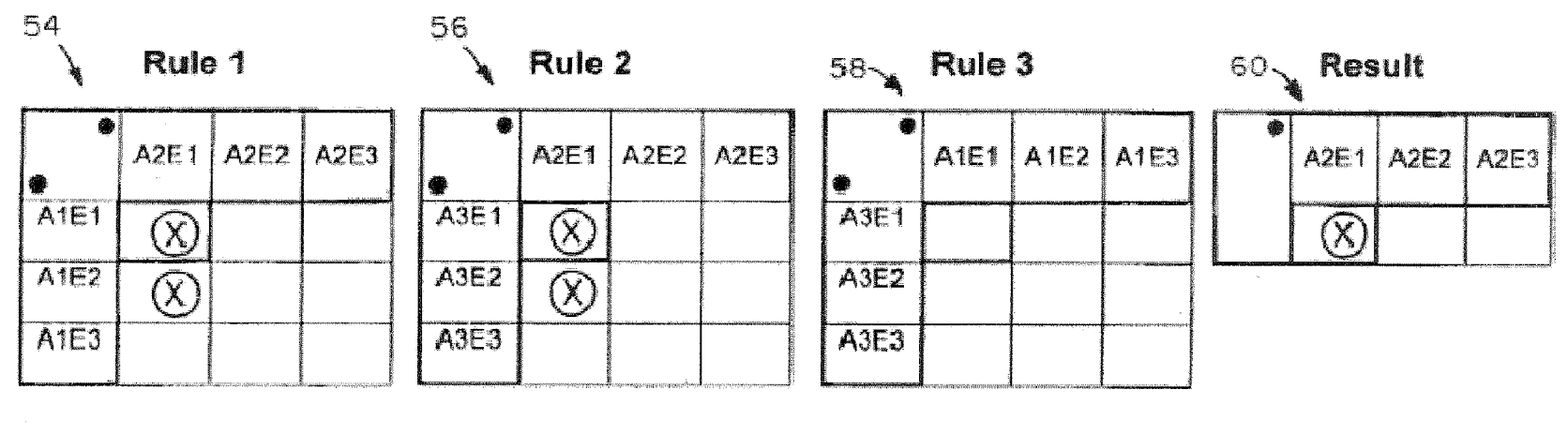

Another situation arises when combining triangular-related Exclude rules (or other cycle Exclude rules) during packaging. Cyclic Exclude rules may inherently engender covers not readily apparent upon examination of the Exclude rules, as apparent in the preceding example. To illustrate, FIG. 13 shows three rules 54, 56, and 58 that are related in a cycle, i.e., a triangular-related rule set. Cycles are formed when rules share an attribute from each of its neighbors. The illustrated three-attribute, three-rule relationship is the simplest such cycle and is often referred to as a triangular relationship. Larger cycles may be formed with any number of rules and attributed.

The clicks (i.e., X-marks) in rule diagrams 54, 56, and 58 established by user activation of pointing device (e.g, computer mouse) illustrate how exclude covers are created when triangular-related rules are combined. When so combined, the three rules have the effect of excluding any combination containing the enumeration A2E1 even though none of them alone (or in a pair) exclude A2E1. Rule diagram 60 of FIG. 13 shows a result of combining Exclude rules 54, 56, and 58. Result 60 may be difficult to envision but becomes more evident when noting that (a) Rule 1 excludes all combinations of A2E1 except those also containing A1E3 (the lower left cell of the rule diagrams), (b) Rule 2 excludes all combinations of A2E1 except for those also containing A3E3 (again, the lower left cell), and (c) Rule 3 excludes all combinations containing both A1E3 and A3E3. Thus, Rule 3 excludes all of the combinations of A2E1 allowed by Rules 1 and 2. The result of combining the three rules operatively excludes all combinations containing A2E1. It is an objective of an aspect of the present invention to identify this situation in cyclically related Exclude rules, and then to reduce the cyclic rule set to a smaller equivalent rule thereby to simply processing. As indicated above, detection of such covers and conversion may be done at the time of rule packaging.

Finding cyclic covers may be NP-complete where there are no known algorithms guaranteed to find all cyclic covers and still complete processing in a finite length of time. Processing time grows linearly with the number of enumerations referenced by cyclic Exclude rules and completes in finite time. The accepted tradeoff is that the algorithm is not guaranteed to find all the covers. Experimentation indicates that cyclic covers of typical complexity can, in practice, be found. Accuracy is estimated to drop to around 80% for unusually complex covers.

Figure 14:
FIG. 14 shows an alternative form of the rule diagrams of FIG. 13 having a more explicitly revealed Exclude cover.

The three may also be represented in a way that makes the cover more apparent. FIG. 14, for example, shows all three triangular-related rules combined into a single larger rule diagram 62. In this form, it becomes easy to see that A2E1 is excluded at all times. Thus, in another embodiment of the invention, combined rule 62 is supplied to the exclude cover finder/routine to discover the exclusion of A2E1. The rule modeler, however, is not expected to generate/discover the combined rule 62, so the method and/or apparatus of the present invention essentially may generate combined rule 62 during the process of removing the triangular cover.

Figure 15:
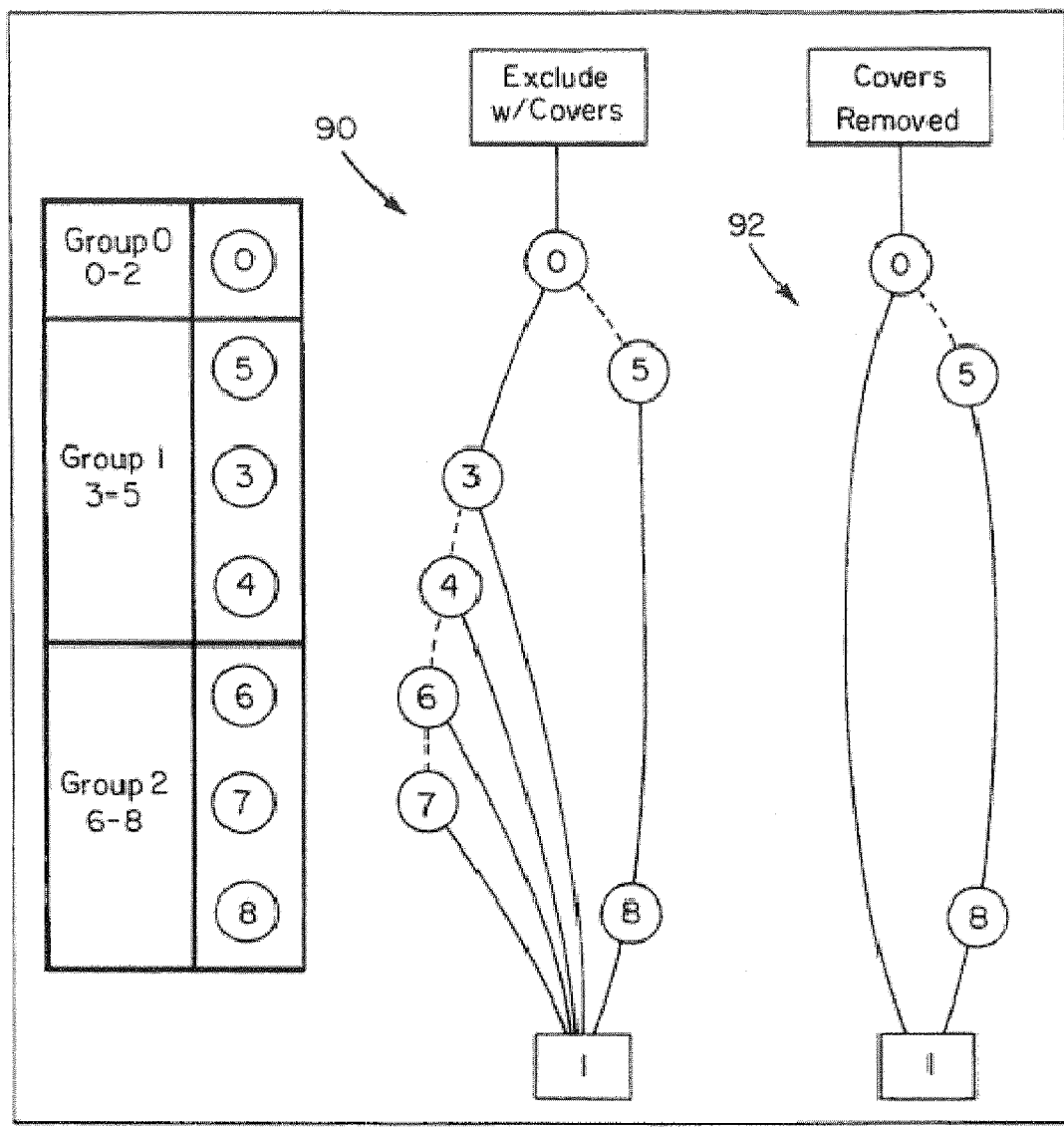
FIG. 15 illustrates a process to remove cyclic covers according to an aspect of the present invention.

FIG. 15 illustrates processing to remove cyclic covers. ZDD tree 90 was constructed using the three-rule cyclic set forth above and the following mapping of enumerations to indexes:

| A2E1 | 0 | A1E1 | 3 | A3E1 | 6 |
| ASE2 | 1 | A1E2 | 4 | A3E2 | 7 |
| A2E3 | 2 | A1E3 | 5 | A3E3 | 8 |

To implement the process, a computer-implementation of the invention converts the enumerations into clicks: 0×3, 0×4, 0×6, 0×7, and 5×8, and creates a first ZDD tree 90. A second ZDD tree 92 shows the resulting, simplified tree with covers removed. An exemplary algorithm, set forth in the Appendix, that removes cyclic covers is called for each group of the ZDD. The algorithm also checks for any enumeration from the selected group that has all members of a second group on its Then and Else legs.

In this fashion, G1=First group, G2=Second group, and G3=Third group. All members of G2 must be present somewhere in the ZDD structure. N1 is a node that is a set of members from G2. All members of N1 must point to the same node on the then leg. N2 is a set of one or more members from G3 in an exclusive relationship. Members of G1 must point to either N1 or N2. Members of G2 must point to N2 or be a part of N1. If the foregoing conditions are met, then all nodes of G1 that point to N2 disappear. The other nodes remain unchanged.

Based on the above teachings, the invention includes a method, apparatus, and/or computer-readable medium (e.g., a magnetic or optical storage medium) and embraces modifications and extensions not explicitly shown in the drawings or described in the written description. The invention is preferably practiced utilizing zero-suppressed binary decision diagrams (ZDDs) but software emulations or other representations of ZDDs, BDD, or directed acyclic graphs (DAGs), regardless of the type of coding implemented, may be employed to achieve substantially the same results. Typically, a keyboard and pointing device (e.g., a mouse) is used to supply inputs to a GUI (graphical user interface). The GUI also is used to provide results to the user. A processor (desktop, handheld, or other portable computing device) typically implements the method. Access and transfer of data may occur locally or via a network, e.g. the Internet or a LAN. Further, even though the exemplary embodiments may be directed to product or service configuration, the invention may be extended to other applications as described in the incorporated and related patents and patent applications. Accordingly, the disclosure is not intended to limit the scope of the invention set forth by the appended claims.

The invention claimed is:

1. A method, comprising:
   identifying, using a processing device, a central component having a pending value of an enumeration not yet selected in a Zero-suppressed Decision Diagram (ZDD) rule model defining at least one attribute or enumeration of a product or service characterized with one or more rule components;
   determining, using the processing device, selection advice for at least one enumeration of at least one rule component directly related to the central rule component based on possible selections of enumerations of other rule components directly related to the central rule component, the at least one rule component being but only indirectly related to others of the at least one rule components; and
   displaying on a display device the selection advice based on the possible selections of the enumerations to enable selection among the possible selections of the enumerations that render the product or service compliant;
   wherein each of the one or more rule components directly relates to the central rule component.

2. The method of claim 1, wherein the determining comprises combining an attribute relation ZDD representative of the central rule component with an attribute relation ZDD of the ZDD rule model.

3. The method of claim 1,
   wherein the central rule component has a mutually exclusive Exclude relationship with one other rule component; and
   wherein the determining comprises assigning a negative selection value to rule components related to the central rule component when a negative selection is denoted for the one other rule component.

4. The method of claim 1,
   wherein the central rule component for which a selection is pending relates to other rule components through an Exclude relationship; and
   wherein the determining comprises propagating a negative selection value to enumeration values of a rule component under examination when the other rule components also have the negative selection value.

5. The method of claim 1, wherein the determining comprises searching through Exclude rules to remove non-essential information by removing covers detected therein.

6. The method of claim 1, wherein the determining comprises searching through Exclude rules to remove cyclic covers.

7. A device, comprising:
   an interface to enable selection of at least one enumeration from at least one attribute of a product or service; and
   a processor configured to:
      identify a common rule component of a Zero-suppress Decision Diagram (ZDD) rule model defining one or more attributes or enumerations of a product or service characterized with one or more rule components;
      determine selection advice for at least one enumeration of at least one rule component directly related to the common rule component based on possible selections of enumerations of other rule components directly related to the common rule component, the at least one rule component being only indirectly related to others of the at least one rule component; and
      cause communication of the selection advice to enable choosing among other enumerations that render the product or service compliant.

8. The device of claim 7,
   wherein the common rule component has a mutually exclusive Exclude relationship with at least one other rule component; and
   wherein the processor is further configured to assign a negative selection value to entire selections of other rule components related to the common rule component when a negative selection is denoted for the one other rule component.

9. The device of claim 7,
   wherein the common rule component for which a selection is pending relates to other rule components by an Exclude relationship; and
   wherein the processor is further configured to propagate a negative selection value to entire enumeration values of a rule component under examination when other components related to the common rule component have the negative value asserted.

10. The device of claim 7, wherein the processor is further configured to effect searching through Exclude rules to remove non-essential information by removing covers detected therein.

11. The device of claim 7, wherein the processor is further configured to effect searching through Exclude rules to detect and remove cyclic.

12. A non-transitory computer-readable medium having computer-executable instructions stored thereon that, in response to execution by a device, cause the device to perform operations comprising:
   utilizing a ZDD rule model to define compliant features including attributes and enumerations of a product or service;
   providing selection advice to guide selection of a desired set of compliant features characterized by multiple rule components of the ZDD rule model;

identifying a common one of the rule components having a pending selection of an enumeration;

determining selection advice for at least one enumeration of at least one rule component directly related to the common one of the rule components based on possible selections of enumerations of other rule components directly related to the common one of the rule components, the at least one rule component being but only indirectly related to others of the at least one rule components; and communicating the selection advice based on the possible selections of the enumerations whereby to enable choosing among enumerations that render features of the product or service compliant.

13. The non-transitory computer-readable medium of claim 12, wherein the common one of the rule components has a mutually exclusive Exclude relationship with one other rule component; and wherein the method further comprises assigning a negative selection value to entire selections of other rule components related to the common central one of the rule components when a negative selection value is denoted for the one other rule component.

14. The non-transitory computer-readable medium of claim 12, wherein the common one of the rule components for which a selection is pending relates to other rule components by an Exclude relationship; and wherein the method further comprises propagating a negative selection value to entire enumeration values of a rule component under examination when other components related to the common one of the rule components have negative advice asserted.

15. The non-transitory computer-readable medium of claim 12, wherein the method further comprises searching through Exclude rules to remove nonessential information by removing covers detected therein whereby to reduce the complexity of the Exclude rules.

16. The non-transitory computer-readable medium of claim 12, wherein the method further comprises searching through Exclude rules to detect and remove cyclic covers whereby to reduce the complexity of the Exclude rules.

17. A system, comprising:

a memory device means for storing instructions; and a processing means configured to execute the instructions stored in the memory device means to:

allow selection, via an interface displayed on a display device, of multiple enumerations of at least one attribute of a product or service;

identify a common one of the rule components having a pending selection of an enumeration;

determine selection advice for at least one enumeration of at least one rule component directly related to the common one of the rule components based on possible selections of enumerations of other rule components directly related to the common one of the rule components in response to the identifying, wherein the at least one rule component is only indirectly related to each of the other rule components; and communicate the selection advice based on the possible selections of the enumerations whereby to enable choosing among enumerations that render features of the product or service compliant.

18. The system of claim 17, wherein the common one of the rule components has a mutually exclusive Exclude relationship with one other rule component; and wherein the processing means is further configured to execute the instructions stored in the memory device to cause the processing means to assign a negative selection value to entire selections of other rule components related to the common central one of the rule components when a negative selection value is denoted for the one other rule component.

19. The system of claim 17, wherein the common one of the rule components for which a selection is pending relates to other rule components by an Exclude relationship; and wherein the processing means is further configured to execute the instructions stored in the memory device to cause the processing means to propagate a negative selection value to entire enumeration values of a rule component under examination when other components related to the common one of the rule components have negative advice asserted.

20. The system of claim 17, wherein the processing means is further configured to execute the instructions stored in the memory device to cause the processing means to search through Exclude rules to remove nonessential information by removing covers detected therein whereby to reduce the complexity of the Exclude rules.

21. The system of claim 17, wherein the processing means is further configured to execute the instructions stored in the memory device to cause the processing means to search through Exclude rules to detect and remove cyclic covers whereby to reduce the complexity of the Exclude rules.

* * * * *

UNITED STATES PATENT AND TRADEMARK OFFICE
CERTIFICATE OF CORRECTION

| | | |
|---|---|---|
| PATENT NO. | : 8,055,604 B2 | Page 1 of 1 |
| APPLICATION NO. | : 12/467928 | |
| DATED | : November 8, 2011 | |
| INVENTOR(S) | : Huelsman et al. | |

It is certified that error appears in the above-identified patent and that said Letters Patent is hereby corrected as shown below:

Title page, item (56), under "Other Publications", in Column 2, Line 2, delete "(in" and insert -- (cited in --.

Title page, item (57), under "Abstract", in Column 2, Line 1, delete "apparatus" and insert -- apparatus, --.

Title Page 2, item (56), under "Other Publications", in Column 2, Line 1, delete "Auxilary" and insert -- Auxiliary --.

Title Page 2, item (56), under "Other Publications", in Column 2, Line 12, delete "Funtions," and insert -- Functions, --.

Title Page 2, item (56), under "Other Publications", in Column 2, Line 24, delete "Characterization,Thesis," and insert -- Characterization, Thesis, --.

Title Page 2, item (56), under "Other Publications", in Column 2, Line 70, delete "Patentablility;" and insert -- Patentability; --.

Title Page 3, item (56), under "Other Publications", in Column 1, Line 2, delete "Patentablility;" and insert -- Patentability; --.

Column 15, line 47, in Claim 1, delete "being but only" and insert -- being only --.

Column 16, line 57, in Claim 11, delete "cyclic." and insert -- cyclic covers. --.

Column 17, line 8, in Claim 12, delete "being but only" and insert -- being only --.

Signed and Sealed this
Twenty-sixth Day of June, 2012

David J. Kappos
*Director of the United States Patent and Trademark Office*